US00RE44924E

(19) United States
(12) Reissued Patent
Cooper et al.

(10) Patent Number: US RE44,924 E
(45) Date of Reissued Patent: Jun. 3, 2014

(54) DIGITAL OBSERVATION SYSTEM

(71) Applicant: Immersive Media of Texas, LLC, Longview, TX (US)

(72) Inventors: Alan Neal Cooper, Coppell, TX (US); Christopher Michael Fritz, Lubbock, TX (US); James Walter Exner, Plano, TX (US)

(73) Assignee: Star Co., Longview, TX (US)

(21) Appl. No.: 13/669,969

(22) Filed: Nov. 6, 2012

Related U.S. Patent Documents

Reissue of:
(64) Patent No.: 7,312,816
Issued: Dec. 25, 2007
Appl. No.: 10/202,283
Filed: Jul. 24, 2002

U.S. Applications:
(63) Continuation of application No. 12/642,698, filed on Dec. 18, 2009, now Pat. No. Re. 43,786, which is an application for the reissue of Pat. No. 7,312,816.

(51) Int. Cl.
*H04N 5/225* (2006.01)

(52) U.S. Cl.
USPC ..... 348/207.1

(58) Field of Classification Search
USPC ..... 348/207.1, 207.11, 211.3, 241, 243
See application file for complete search history.

(56) References Cited

U.S. PATENT DOCUMENTS 4,584,656 A 4/1986 Sakai et al.
4,780,761 A 10/1988 Daly et al.
5,023,725 A 6/1991 McCutchen
5,040,063 A 8/1991 Citta et al.
5,249,051 A 9/1993 Elberbaum et al.
5,450,140 A 9/1995 Washino
5,659,776 A 8/1997 Chauvel
5,689,313 A 11/1997 Sotheran
5,703,604 A 12/1997 McCutchen
5,926,209 A 7/1999 Glatt
5,995,140 A 11/1999 Cooper et al.
6,009,305 A 12/1999 Murata
6,023,131 A 2/2000 Okita
6,141,034 A 10/2000 McCutchen
6,215,898 B1 4/2001 Woodfill et al.
6,240,217 B1 5/2001 Ercan et al.
6,259,271 B1 7/2001 Couts-Martin et al.
6,317,166 B1 11/2001 McCutchen
6,330,027 B1 12/2001 Haba
6,381,007 B2 4/2002 Fabre et al.
6,493,025 B1 12/2002 Kiriyama et al.
6,493,034 B1 12/2002 Elderbaum
6,514,083 B1 2/2003 Kumar et al.
6,567,869 B2 5/2003 Shirley
6,573,931 B1 6/2003 Horii et al.

(Continued)

*Primary Examiner* — Jason Whipkey
(74) *Attorney, Agent, or Firm* — McAndrews, Held & Malloy, Ltd.

(57) ABSTRACT

A digital observation system and method for processing and transmitting video data between a video camera, or video cameras, and a base unit. The video data is transmitted, for example, by a communication protocol that is compliant with Ethernet physical drivers for transmitting and receiving data at around 100 Mbps. Video is captured at a sensor in the video camera, digitally processed and transmitted, thus overcoming limitations associated with analog processing and allowing unique features to be added. Images and other data may be transmitted efficiently in their native format, with reduced overhead, and in a non-compressed format due to the data transmission rate at or below 100 Mbps.

23 Claims, 5 Drawing Sheets

(56) References Cited

U.S. PATENT DOCUMENTS

| | | | |
|---|---|---|---|
| 6,735,190 | B1 | 5/2004 | Chuah et al. |
| 6,748,577 | B2 | 6/2004 | Bal |
| 6,757,413 | B1 | 6/2004 | LeMahieu |
| 6,825,876 | B1 | 11/2004 | Easwar et al. |
| 6,977,683 | B1 | 12/2005 | Okada |
| 7,312,816 | B2 | 12/2007 | Cooper et al. |
| 2001/0008419 | A1 | 7/2001 | Sano et al. |
| 2001/0030694 | A1 | 10/2001 | Abe |
| 2002/0051065 | A1 | 5/2002 | Takahashi |
| 2002/0054222 | A1 | 5/2002 | Nitta et al. |
| 2002/0126150 | A1 | 9/2002 | Parry |
| 2002/0140857 | A1 | 10/2002 | Limaye |
| 2003/0128283 | A1 | 7/2003 | Watanabe et al. |
| 2003/0131127 | A1 | 7/2003 | King et al. |
| 2003/0193567 | A1 | 10/2003 | Hubel |
| 2004/0017477 | A1 | 1/2004 | Cooper et al. |
| 2004/0201686 | A1 | 10/2004 | Amling et al. |
| 2005/0146610 | A1 | 7/2005 | Creamer et al. |
| 2005/0146611 | A1 | 7/2005 | Vu et al. |
| 2005/0185056 | A1 | 8/2005 | Hirasawa |

DIGITAL OBSERVATION SYSTEM

Matter enclosed in heavy brackets [ ] appears in the original patent but forms no part of this reissue specification; matter printed in italics indicates the additions made by reissue.

RELATED APPLICATIONS

*The present application is an application for reissue of U.S. Pat. No. 7,312,816, and is a continuation of U.S. application Ser. No. 12/642,698, filed Dec. 18, 2009, which is also an application for reissue of U.S. Pat. No. 7,312,816, now U.S. Pat. No. Re. 43,786.*

The present invention is related to patent application Ser. No 10/202,968 titled DIGITAL TRANSMISSION SYSTEM, to patent application Ser. No. 10/202,668 titled DIGITAL CAMERA SYNCHRONIZATION, and to patent application Ser. No. 10/202,257 titled UNIVERSAL SERIAL BUS DISPLAY UNIT. These applications are commonly assigned, commonly filed, and are incorporated by reference herein.

1. FIELD OF THE INVENTION

The present invention relates to observation systems and, more particularly, to a digital observation system comprising a digital camera and a base unit.

2. BACKGROUND OF THE INVENTION

A conventional observation system is based on standard analog cameras attached, via a specialized cable, to a Cathode Ray Tube monitor for display. All video processing is performed in the analog domain. This type of conventional system has several limitations including noisy video, low interlaced resolution, slow frame rate or image roll during switching, limited display capabilities and limited storage and processing options. Therefore, it is desirable for the present invention to overcome the conventional limitations associated with processing video in the analog domain.

SUMMARY OF THE INVENTION

The present invention achieves technical advantages as a digital observation system and method for processing and transmitting video data between a video camera (or video cameras) and a base unit via, for example, a communication protocol that is compliant with Ethernet physical drivers for transmitting and receiving data at around 100 Mbs. With such a digital observation system, video is captured at a sensor in the video camera, digitally processed and transmitted, thus overcoming the aforementioned limitations and allowing unique features to be added. Images and other data may be transmitted efficiently (in their native format), with reduced overhead (header information can be minimized), and in a non-compressed format (since transmission occurs at or below 100 Mbs).

In one embodiment, a digital observation system comprises a digital camera and a base unit. The digital camera includes a charge coupled device (CCD) image sensor memory, a CCD image sensor, a correlated double sampling (CDS) circuit, and a physical interface. The CCD image sensor memory is adapted to store video data, while the CCD image sensor is adapted to transmit the stored video data in analog RGB color space format native to the CCD image sensor (analog RGB data), where the CCD image sensor comprises the CCD image sensor memory. The CDS circuit is adapted to receive the analog RGB data from the CCD image sensor and convert the analog RGB data into digital RGB data and the physical interface is adapted to receive the digital RGB data and transmit the digital RGB data with reduced operational overhead and increased operational functionality. The base unit includes a base unit physical interface, a base unit programmable logic device (PLD), and a display. The base unit physical interface is adapted to receive the digital RGB data with the reduced operational overhead and the increased operational functionality from the digital camera physical interface and display it via the display. The base unit PLD is coupled to the base unit physical interface and the display.

DETAILED DESCRIPTION OF THE INVENTION

Figure 1:
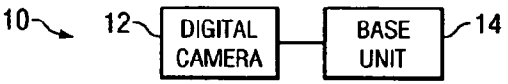
FIG. 1 illustrates a block diagram of a digital observation system in accordance with an exemplary embodiment of the present invention.

Referring now to FIG. 1, a digital observation system 10 of the present invention is presented. The system 10 includes at least one digital camera 12 coupled to at least one base unit 14 via, for example, an Ethernet connection.

Figure 2:
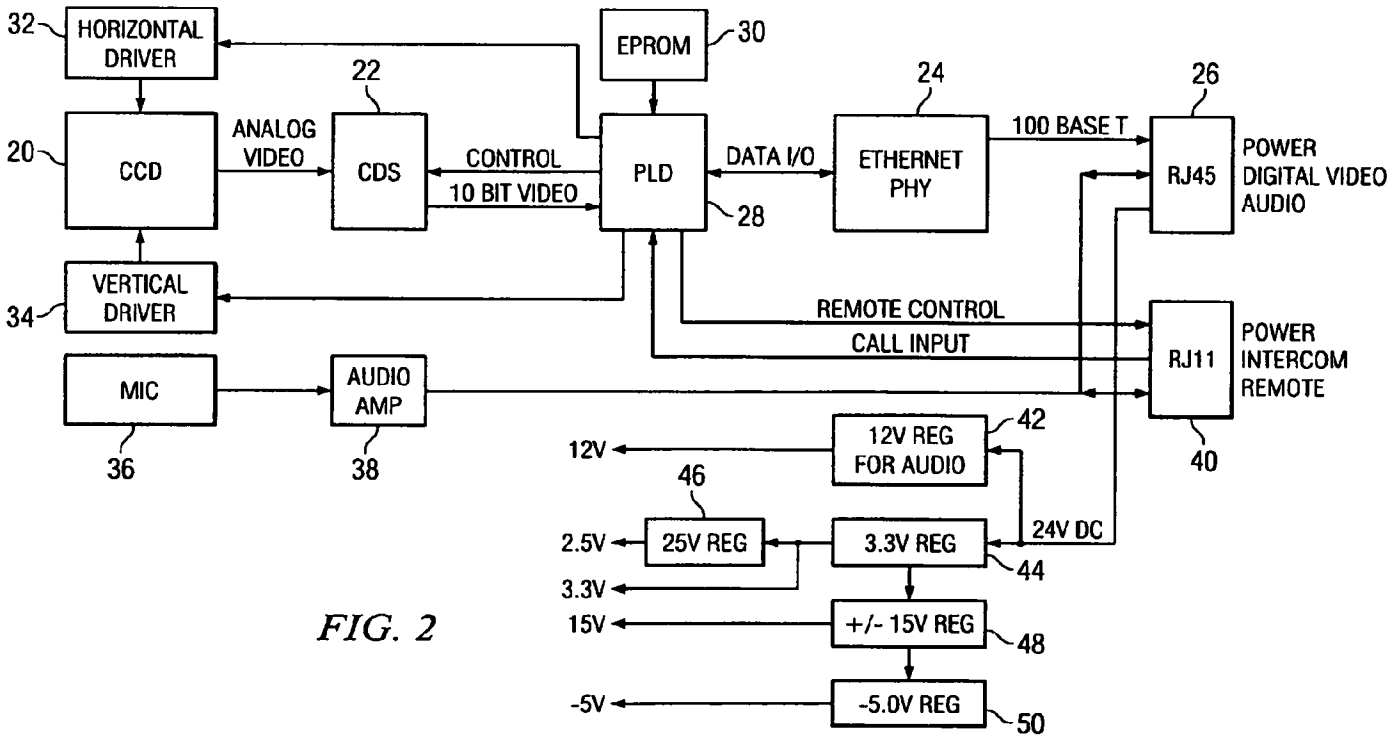
FIG. 2 illustrates a block diagram of a digital camera in accordance with an exemplary embodiment of the present invention.

Referring now to FIG. 2, the digital camera 12 is presented. The digital camera 12 includes a charge coupled device (CCD) image sensor 20 which includes a CCD memory (not shown), a correlated double sampling (CDS) circuit 22, and a physical interface 24. Although the image sensor preferably used by the present invention is a CCD image sensor, a complementary metal oxide semiconductor (CMOS) image sensor may also be used. The CCD image sensor is a collection of tiny light-sensitive diodes, called photosites, which convert photons (light) into electrons (electrical charge). Each photosite is sensitive to light, wherein the brighter the light that hits a single photosite, the greater the electrical charge that will accumulate at that site. The value (accumulated charge) of each cell in an image is read and an analog-to-digital converter (ADC—not shown) turns each pixel's value into a digital value. In order to get a full color image, the sensor uses filtering to "look at" the light in its three primary colors (Red Green Blue or RGB) optically or electrically, filtered or unfiltered. Once all three colors have been recorded, they can be added together to create a full spectrum of colors.

The CCD memory is adapted to store video data and the CCD image sensor 20 is adapted to transmit the stored video data in analog RGB color space format native to the CCD image sensor (such data will hereinafter be referred to as "analog RGB data"). The CDS circuit 22 is adapted to receive the analog RGB data from the CCD image sensor 20 and convert the analog RGB data into digital RGB data, wherein the CDS circuit is operably coupled to the CCD image sensor. The physical interface 24, such as an Ethernet physical interface for example, is adapted to receive the digital RGB data and transmit the digital RGB data with reduced operational overhead and increased operational functionality via an RJ45 (or similar) connector 26, wherein the physical interface is operably coupled to the CDS circuit 22. The operational overhead includes at least one of: a multi-drop operation, error detection, source addressing, destination addressing, and multi-speed operation, while the operational functionality includes at least one of: header data, secondary data, and error correction.

The digital camera 12 further includes a Field-Programmable Gate Array (FPGA) or Programmable Logic Device (PLD) 28 that interfaces to the CDS circuit 22 and controls timing signals to the CCD image sensor 20 to transmit the analog RGB data to the CDS circuit and is adapted to delay one line of the digital RGB data with the reduced operational overhead and the increased operational functionality transmission when a transmission error correction occurs. The PLD 28 is a circuit that can be programmed to perform complex functions. The digital camera PLD 28 is more fully discussed in the description of FIG. 3 below. An erasable programmable read-only memory 30, which is a type of memory that retains its contents until it is exposed to ultraviolet light (the ultraviolet light clears its contents, making it possible to reprogram the memory), is coupled to the PLD 28. Additionally, a horizontal driver 32, a vertical driver 34, and an RJ11 (or similar) connector 40 are coupled to the PLD 28. The horizontal driver 32 and the vertical driver 34, further coupled to the CCD image sensor 20, convert logic level signals to voltage levels that the CCD image sensor can utilize. A "remote control" message may be sent from the PLD 28 to an external module (such a voice or data platform), via the RJ11 connector 40, to indicate data to be transferred between the digital camera 12 and the external module (not shown) via commands from the base unit 14 (attached to the digital camera 12 via the RJ45 connector 26). A "call input" message may be sent to the PLD 28 from the external module.

The digital camera 12 also includes a microphone 36 coupled to an audio amplifier 38, for supporting full duplexed audio, which is further coupled to the RJ11 connector 40. The digital camera 12 preferably utilizes a single input voltage of 14V to 40V and generates the multiple voltages that are needed by the logic devices and the CCD image sensor 20. These multiple voltages include a linear regulated output voltage 42 for the RJ11 device interface which provides 12 V (25 mA max), a main system power supply 44 which generates all of the multiple voltages other than the linear regulated output voltage 42 and provides 3.3 V (1.65 A), a core voltage 46 for the PLD 28 which provides 2.5 V (mA), a CCD amplifier voltage 48 which provides 15 V (mA), and a CCD substrate bias which provides −5.5 V (mA). The digital camera 12 additionally utilizes various clocks including clocks for CCD timing and clock generation, for outputting to the physical interface 24, and a main video processing clock.

In a preferred embodiment, the digital camera 12 comprises a memory adapted to store video data, a first circuit (for example, the CCD image sensor 20) adapted to transmit the stored video data in a first representation of a first format (for example, analog RGB data), wherein the first circuit comprises the memory, a second circuit (for example, the CDS circuit 22) adapted to receive the data in the first representation of the first format from the first circuit and convert the data in the first representation of the first format into a second representation of the first format (for example, digital RGB data), wherein the first circuit is operably coupled to the second circuit, a third circuit (for example, the digital camera PLD) adapted to control timing signals to the first circuit to transmit the data in the first representation of the first format to the second circuit, wherein the third circuit interfaces to the first circuit and to the second circuit, and a fourth circuit (for example, the interface) adapted to receive the data in the second representation of the first format from the second circuit and transmit the data in the second representation of the first format, wherein the fourth circuit is operably coupled to the second circuit.

In an alternate embodiment, the digital camera 12 comprises a memory adapted to store video data, a first circuit adapted to transmit the stored video data in a first format, wherein the first circuit comprises the memory, a second circuit adapted to receive the data in the first representation of the first format from the first circuit, wherein the first circuit is operably coupled to the second circuit, a third circuit adapted to control timing signals to the first circuit to transmit the data in the first format to the second circuit and convert the data in the first format into a second format (for example, digital RGB data), wherein the third circuit interfaces to the first circuit and to the second circuit, and a fourth circuit adapted to receive the data in the second format from the second circuit and transmit the data in the second format, wherein the fourth circuit is operably coupled to the second circuit.

Figure 3:
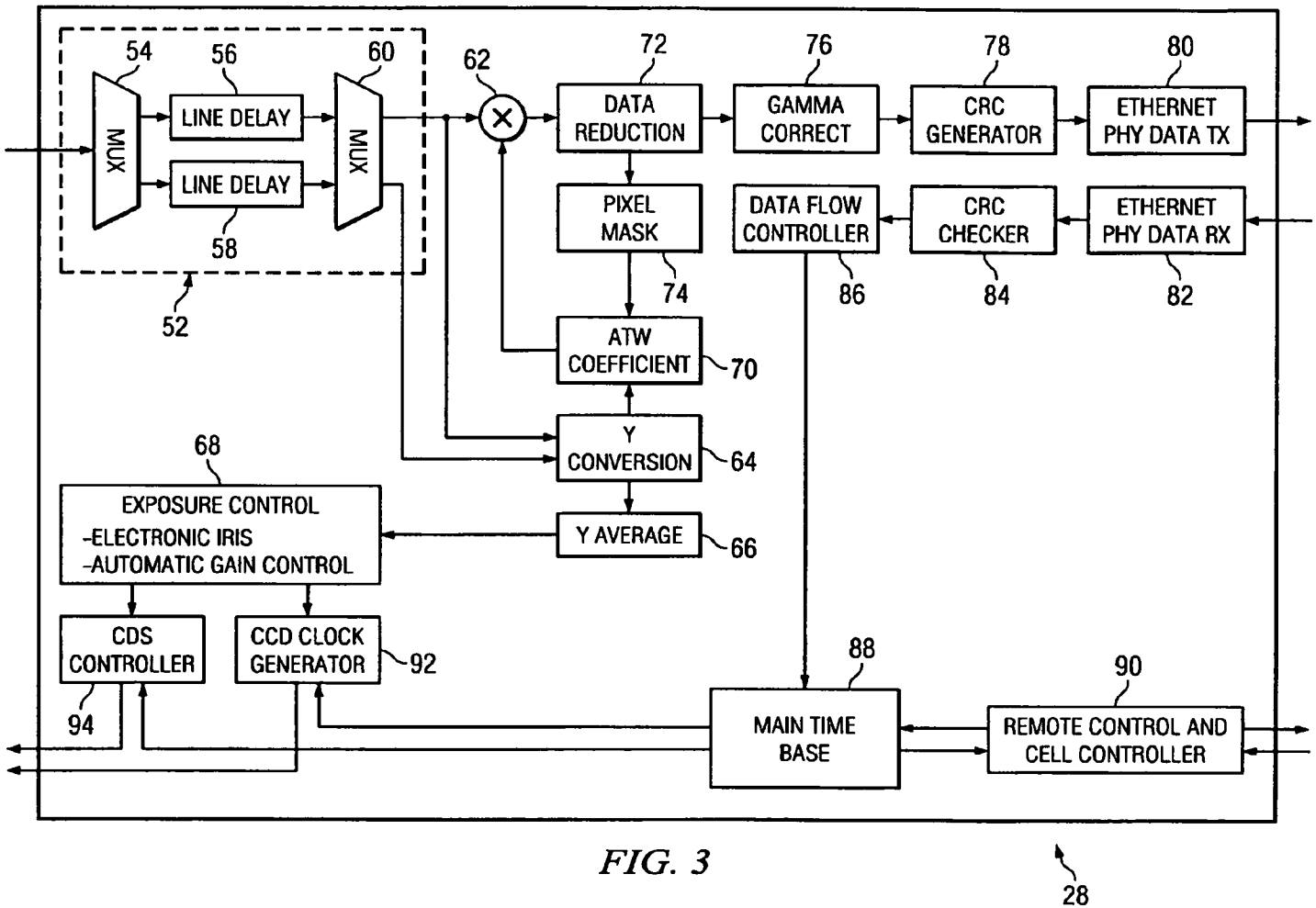
FIG. 3 illustrates a block diagram of a programmable logic device of the digital camera in accordance with an exemplary embodiment of the present invention.

Referring now to FIG. 3, the digital camera PLD 28 is presented. The digital camera PLD 28, which contains logic that is responsible for timing, video processing, data reception and data transmission, includes a two video line delay memory 52 adapted to receive the digital RGB data from the CDS circuit 22. The digital RGB data is received at a first multiplexer 54 which transfers the data into a first line delay 56 or into a second line delay 58 depending on which line delay is used for storing new data and which line delay is used for outputting to a destination such as the base unit 14. For example, the first line delay 56 may be used to read in a new line of data from the CCD image sensor 20 via the CDS circuit 22 while the second line delay 58 may output the data to be processed. If a line of data has to be repeated then the CCD image sensor 20 does not read in a new line into the first line delay 56 and the last line readout of the second line delay 58 is repeated. A second multiplexer 60 transfers the line of data to be output to video processing modules (such as a data reduction circuit 72 and a gamma correct circuit 76) and transmission modules (such as a cyclic redundancy check (CRC) generator 78 and an Ethernet physical data transmission module 80). Such modules are described further below. The two line delays 56, 58 collectively hold the last two lines read out from the CCD image sensor 20. One line contains red and green data while the other line contains green and blue data. This is the format of the data in the CCD image sensor 20.

A Y conversion circuit 64 requires red, green, and blue data so data from both line delays 56, 58 are read into the Y conversion circuit each time a conversion from RGB to YUV is to be calculated. YUV is a format that represents the signal as luminance and chrominance information and is a widely used video format for the transmission of digital video data. The Y conversion circuit 64 sends the YUV data to a Y average circuit 66 which progressively calculates the average Y value for the whole image when all lines of the frame of data are readout. The Y average circuit 66 basically finds the average brightness of the whole image. Once the Y value for the whole image has been calculated, the data is sent to an exposure control circuit 68 which calculates the correct timing signals to be sent to the CCD image sensor 20 to get the proper exposure control for the CCD image sensor. The exposure control circuit 68 also sends an amplifier gain control to the CDS circuit 22 which includes a variable gain amplifier (not shown) to adjust the signal level from the CCD image sensor 20 before the analog to digital conversion.

The Y conversion circuit also sends the Y value for each pixel to an auto tracking white (ATW) coefficient circuit 70 to discriminate the use of pixels with too large or small of a Y value so as to improve the ATW performance. ATW is used to make color corrections to ensure that white is the correct color. The ATW coefficient circuit 70 calculates an average red pixel value for the whole image along with the same for the blue and green pixels. It then calculates correction factors (gain changes) for the red pixels and the blue pixels so that the red, green, and blue pixel average for the whole frame are the same. As such, the whole frame includes equal values of red, green, and blue averages. These correction factors are fed to the multiplier 62 that connects the second multiplexer 60 and the data reduction circuit 72. The red correction factor is multiplied on all red pixels and the blue correction factor is calculated on all the blue pixels. The data reduction circuit 72 is used to reduce the number of bits for each pixel back to nine bits. The CDS circuit 22 outputs ten bits for each pixel and the multiplier 62 increases that number by several more bits. As such, the data reduction circuit 72 truncates this amount back to nine bits.

From the data reduction circuit 72, the pixels are sent to either a pixel mask 74, that is used to improve the performance of the ATW coefficient circuit 70, or to the gamma correct circuit 76 that puts each pixel value through a non-linear transfer function to enhance the values of pixels that are low. This action also corrects a non-linear transfer function at a final display in the base unit 14. The CRC generator 78 calculates a CRC value for each line transmitted to the base unit 14. The CRC value is added to the end of the line transmission so that the receiving base unit 14 can make the same calculation for the line of data it received to verify that the data received is correct. The Ethernet physical data transmission module 80 outputs header data to the base unit 14 prior to transmitting the line of video data. The header data consist of a preamble (so as to alert the receiver that new data is coming) and secondary data (such as the line number of the data to be transmitted) that the digital camera 12 needs to send to the base unit 14. The line of video data and the CRC data is transmitted as one continuous stream of data until the CRC is complete. In a preferred embodiment, the data is input into the Ethernet physical data transmission module 80 in groups of 4 bits at a time, wherein two groups of 4 bits contains one pixel of data. As such, a pixel is sent as an 8 bit word.

The Ethernet physical data receiver module 82, which is used to receive data from the base unit 14, removes the header data and outputs 4 bit words to a CRC checker module 84. It should be understood that the data may be input into the Ethernet physical data transmission module 80 and output to the CRC checker module 84 at a greater and/or a lesser aforementioned amount. The CRC checker module 84 calculates the CRC value as the data is received and sends the data to a data flow controller 86 which holds all of the data until all of it is received and the CRC is checked. If the CRC check shows the data is correct, the data flow controller 86 sends the data to the main time base 88. The data sent informs the digital camera 12 if it is time to start a new frame of data or if the last line was received and further includes any control signals that the base unit 14 needs to send the camera to control the operation of the camera. The main time base 88 controls all of the timing functions of the camera 12 (but is preferably slaved to the base unit 14 time base) including exposure control and video processing synchronization. The main time base 88 can also send signals to a remote control and call controller 90 which is connected to a connector (not shown) on the camera 12 enabling signals to be input into the camera or output from the camera to control external devices (not shown) connected to the camera. External devices connected to the camera 12 are thus enabled to communicate to the camera and the base unit 14 through the main time base 88 and the Ethernet physical data transmission and receiver modules 80, 82. The Main Time Base 88 also controls all of the timing for the CCD image sensor 20 through a CCD clock generator 90 and by sending signals directly to the CCD image sensor. The main time base further sends signals to a CDS controller 94 which sets all of the configurations for the CDS circuit 22 and controls the synchronization of the CDS samples of the analog RGB data.

In a preferred embodiment, the digital camera PLD 28 is adapted to control timing signals to the CCD image sensor 20 to transmit analog RGB data to a CDS circuit 22 where the analog RGB data is converted to digital RGB data, and delay one line of the digital RGB data transmission (by a two video line delay memory) when a transmission error correction occurs, wherein the digital RGB data transmission comprises the reduced operational overhead and the increased operational functionality.

In an alternate embodiment, the digital camera PLD 28 is adapted to receive digital RGB data from the CDS circuit 22, convert the received digital RGB data into digital YUV data, and transmit the digital YUV data to the CDS circuit 22, wherein the digital camera PLD interfaces to the CDS circuit.

Figure 4:
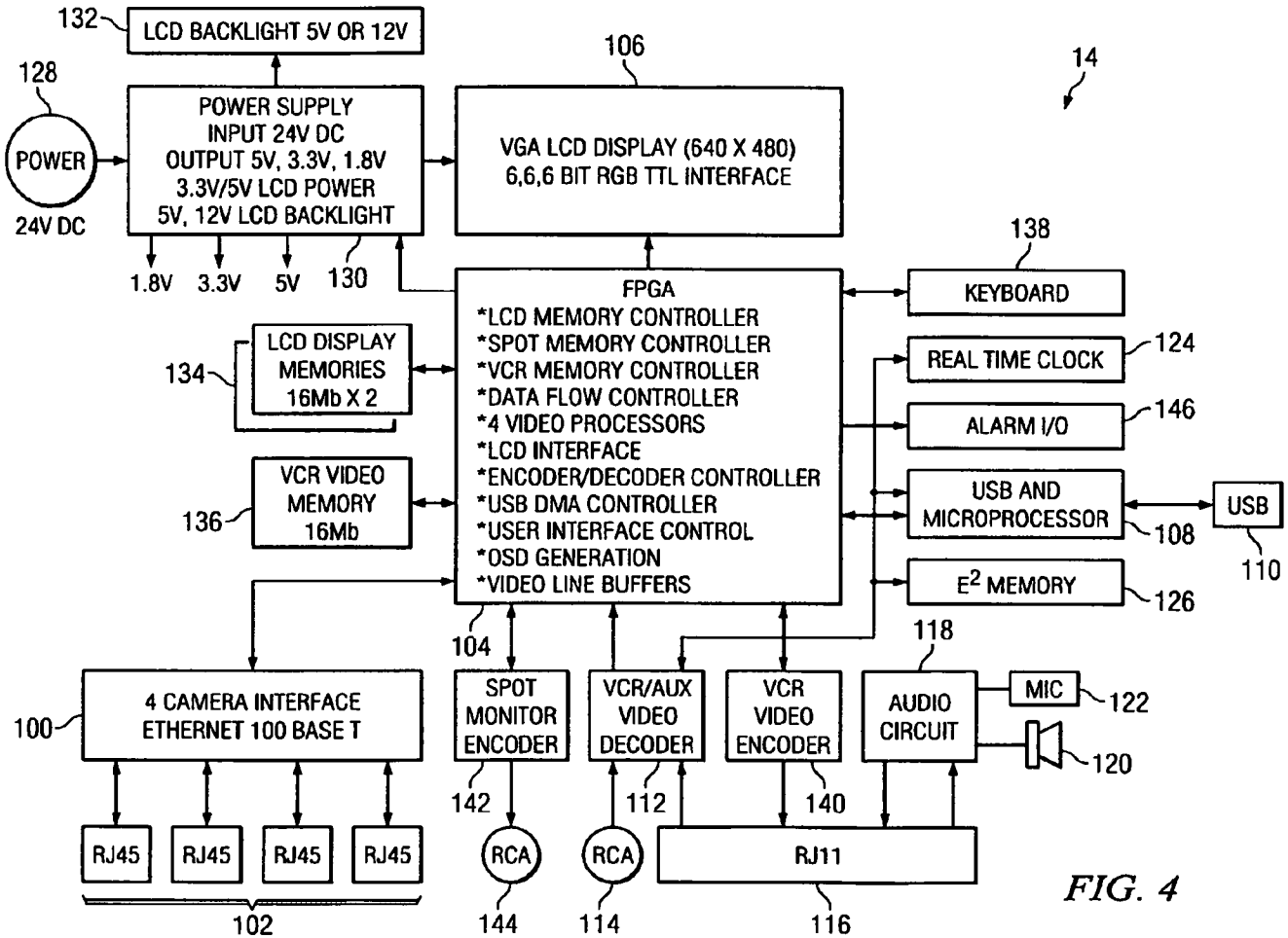
FIG. 4 illustrates a block diagram of a base unit in accordance with an exemplary embodiment of the present invention.

Referring now to FIG. 4, the base unit 14 is presented. The base unit 14 comprises a camera interface module (or base unit physical interface) 100 which interfaces to the digital camera 12 via RJ45 connectors 102. The camera interface module 100 is operably coupled to a base unit FPGA/PLD 104 which is further operably coupled to a display 106 which is adapted to display the received video data.

The base unit 14 further comprises a microprocessor including a USB interface 108 that receives (or is adapted to receive) video data from a first source, such as, for example, a personal computer (not shown) via a physical USB interface or data port 110, and a video decoder 112 that receives other video data from a second source, such as another video source, via a connection plug 114 and/or an RJ11 connector 116. The microprocessor 108 manages and controls the operational functions of the base unit 14 including managing the display 106 and also controls a user interface. The microprocessor 28 further controls the USB interface 110 and the data associated with it including data flow management, data transfer and reception. The video decoder 112 is used to digitize the incoming analog video signal and the decoder's 112 output, for example, may be the spatial resolution of 4:2:2 (intensity:reddishness:blueishness) YUV digital video data. There are a plurality of bits of data for each pixel and horizontal and vertical synchronization signals are output from the decoder 112 in addition to a data valid signal. The microprocessor 108 can transmit the PLD 104 processed video data to the first source via the USB port 110 which may further receive audio data from the first source.

An audio circuit 118 takes audio data and amplifies it for output to a speaker 120 and/or to the RJ11 connector. Audio information can also be received via the RJ11 connector 116 and/or the microphone 122, and can also be output via the USB port 110 provided a D/A converter was present in the audio circuit. A real-time clock 124 transmits and receives time and date information between the video decoder 112, the microprocessor 108 and a second memory 126 and further stores configuration registers and timer functions. The second memory 126, which is operably coupled to the microprocessor 108 and the video decoder 112, maintains operation code of the microprocessor. The base unit 14 preferably operates from an external 24V (or alternatively a 12V) DC wall mount power supply 128 that supplies all the power necessary for the display 106 to operate. A power supply 130 is designed to protect the base unit 14 from excess voltage inputs and to filter any noise from entering or exiting the display unit. The power supply 130 further creates multiple DC voltages (such as 1.8V, 3.3V, and 5V) to supply various portions of the base unit 14.

In an exemplary embodiment, the display 106 is a video display monitor utilizing an LCD active matrix display with a VGA resolution of 640 pixels by 480 lines (although the resolution could be higher or lower). The interface to the display 106 is comprised of a plurality of logic level clock signals that are used for clocking, synchronization, and data transfer. The power supply module 130, which receives power from an external adapter (not shown), creates a plurality of voltages to supply the display 106 and a backlight 132. The backlight 132 applies a voltage to tubes (not shown) that illuminate the display 106, where the tubes are operably coupled to the monitor. The base unit 14 will have enough memory, such as the memories 134 and 136 (which are preferably synchronous dynamic random access memories), to store a number of images so that the rate for switching display images is not effected by the transfer time of the data sent by the camera 12 and or a first source over the USB connection 110. The base unit 14 may further be controlled by a keyboard 138 which is operably coupled to the PLD 34.

The PLD 104 is the primary controller for the functions of the various portions of the base unit 14. One of these functions includes managing (which includes reading, writing, and refreshing) the memories 134, 136 that are utilized to store the images that are to be displayed on the display 106. The data input to the memories 134, 136 are received from, the camera interface module 100, the video decoder 112, and/or the USB microprocessor 108. The memories 134, 136 size are dependant on the screen resolution of the display 106 and can contain multiple images for display as well as buffer memory that will be utilized as a receiving buffer for new images. The output of the memory data is sent to a scalar (not shown) which is located in the PLD 104 to convert the data to the appropriate data size for the display 106.

Other functions of the PLD 104 include controlling the data flow from the USB data port 110, the video decoder 112, the memories 134, 136, and the display 106, interfacing to the display, developing all the necessary signals for a time-base of the display, direct memory access controlling of the data from the microprocessor 108 to the memories 134, 136, managing the user interfaces, transmitting the data to the microprocessor, generating an "on screen display" thereby enabling a user to program and adjust display parameters, buffering video data as it transfers from different circuit areas that operate at different data rates, scaling the video data to be displayed to the appropriate resolution for the display, and controlling various first-in-first-out (FIFO) controllers (such as spot memory controllers and VCR memory controllers). Further functions include performing video processing such as enhancing the video by controlling the contrast, brightness, color saturation, sharpness, and color space conversion of the video data that is received.

In a preferred embodiment, the base unit 14 comprises the base unit physical interface 100 adapted to receive the digital RGB data with the reduced operational overhead and the increased operational functionality from the digital camera physical interface 24, the base unit PLD operably coupled to the base unit physical interface, and the display 106 adapted to display the digital RGB data with reduced operational overhead and increased operational functionality, wherein the display is operably coupled to the PLD. The base unit PLD is further adapted to control timing signals to display the digital RGB data with the reduced operational overhead and the increased operational functionality.

In a further embodiment, the base unit 14 comprises a first circuit (for example, the base unit interface 100) adapted to receive transmitted data in a second representation of a first format (for example, digital RGB data), a second circuit (for example, the display), and a third circuit (for example, the base unit PLD) adapted to control timing signals to the first circuit to transmit the data in the second representation of the first format for display via the second circuit, wherein the third circuit interfaces to the first circuit and to the second circuit.

In an alternate embodiment, the base unit 14 comprises a physical interface adapted to receive digital YUV data with reduced operational overhead and increased operational functionality from a digital camera physical interface, a PLD operably coupled to the base unit physical interface, and a display adapted to display the digital YUV data with reduced operational overhead and increased operational functionality, wherein the display is operably coupled to the PLD.

Figure 5:
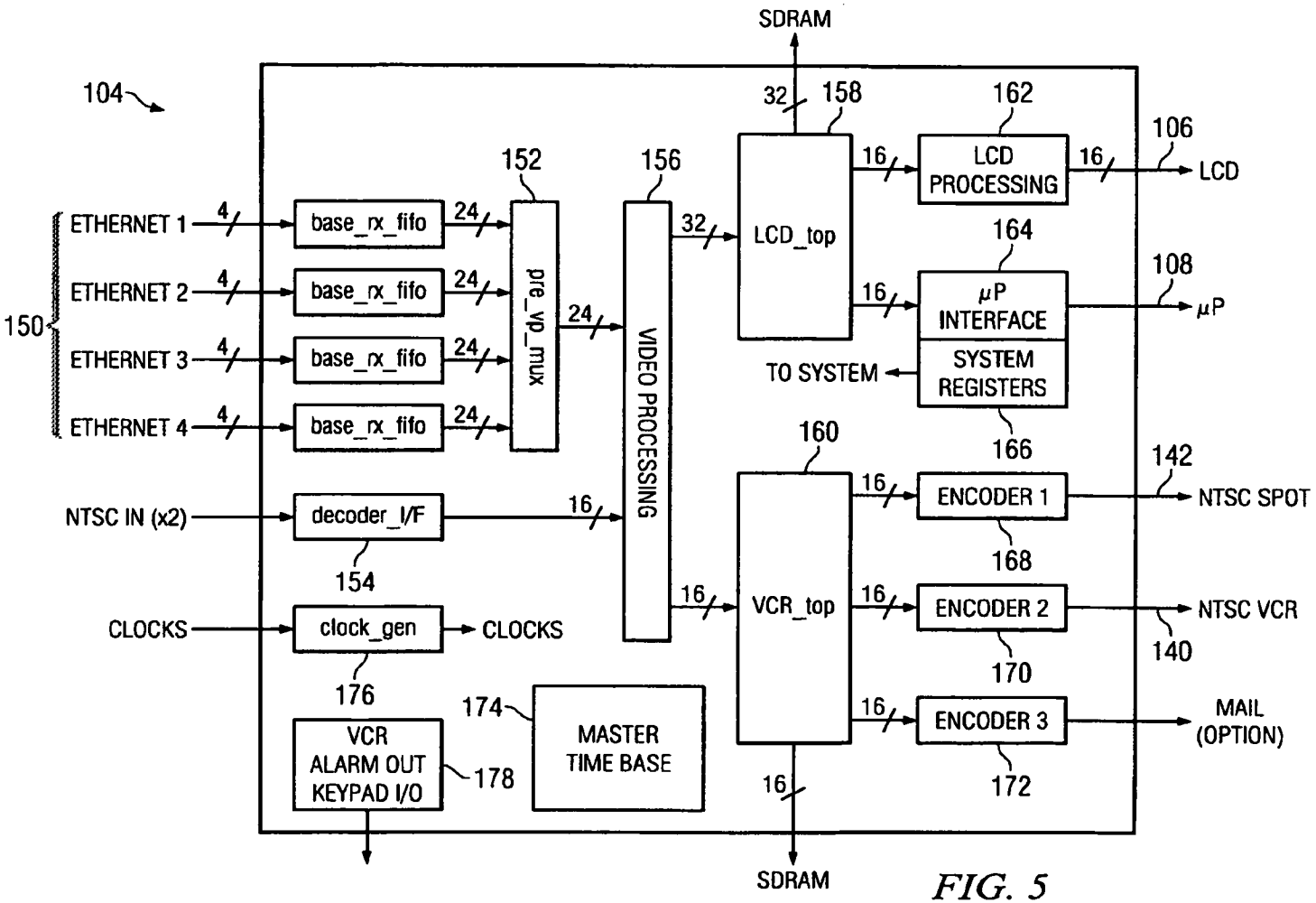
FIG. 5 illustrates a block diagram of a programmable logic device of the base unit in accordance with an exemplary embodiment of the present invention.

Referring now to FIG. 5, the base unit PLD 104 is presented. The base unit PLD 104 comprises a plurality of base unit FIFO modules 150 which manipulate the digital camera data received over, for example, an Ethernet transmission into a form that can be used by the base unit 14. The FIFO modules 150 synchronize data from an asynchronous clock (which may be generated by the physical interface 24) to a system clock (such as a master time base 174, described further below), perform a CRC check and transmit a valid or non-valid data receive, calculate a CRC and transmit control data to the digital camera 12, convert Bayer CFA data from 8-bit to 24-bit RGB output, and output CIF resolution data (for example, 352×288) and VGA resolution data (for example, 640×480).

A pre-video processor multiplexer 152 receives the 24-bit RGB data from the FIFO modules 150 and creates a multiplexed high-speed data stream for processing to reduce the logic required for processing a plurality of video inputs. The 24-bit RGB data is preferably multiplexed into one 24-bit stream at 62.5 MHz (for both VGA and CIF resolutions) and performs a color space conversion to YCrCb 4:4:4 (which is a color space similar to YUV).

A decoder interface 154 receives data from the video decoder 112 and synchronizes the asynchronous decoder data to the system clock, converts the 4:2:2 data to 4:4:4 data for processing, scales the VGA resolution to CIF resolution, and outputs VGA resolution data.

A video processing module 156 receives the YCrCb 4:4:4 multiplexed 24-bit stream at 62.5 MHz from the pre-video processor multiplexer 152 and also receives the YCrCb 4:4:4 data as well as the VGA resolution data from the decoder interface 154. This received data is processed by multiplexing the data from the decoder interface 154 into a high-speed serial digital camera stream, performing a 4:4:4 to 4:2:2 conversion, parsing the data stream into three potential outputs (to the display 106, the USB interface 110, and/or the NTSC or video decoder 112, and stacking the display and USB bits into 32-bit wide words.

The video processing module 156 outputs reformatted data to an LCD top module 158 and to a VCR top module. The LCD top module 158 performs SDRAM memory control functions and formats the output data to the required output format for display via the display 106. The VCR top module 160 performs SDRAM memory control functions and formats the output data to the required output format to the microprocessor 108 (for USB data) or to the LCD 106 for display. The LCD top module 158 outputs a 16-bit YUV data stream to an LCD processing module 162 and to a microprocessor interface 164. The LCD processing module 162 interfaces to the display 106, formats the data to the display and provides the following functions: YCrCb 4:2:2 to 4:4:4 conversion, color, brightness, contrast, and sharpness adjustment, YCrCb to RGB conversion, RGB 18-bit formatting, and on screen display (such as a menu) insertion. The microprocessor interface 164 stores the system wide control registers 166 and interfaces to the microprocessor 108. The VCR top module 160 outputs a 16-bit YUV data stream to the plurality of encoders 168-172 that format the data to the necessary configuration for the NTSC encoder interfaces such as interfaces or connection plugs 116, 144.

The master time base 174 generates the timing for the entire system 10. It has multiple counters on different clocks to control the different system inputs and outputs. The time bases controlled by the master time base 174 include: vertical synchronization to the camera 12 (or to a plurality of cameras), NTSC encoder output, LCD master timing, LCD SDRAM frame synchronization, and NTSC SDRAM frame synchronization. A clock generator 176 generates various clock frequencies for the master time base 174 to operate, while a VCR alarm module 178 instructs a VCR to record under alarm conditions. The VCR alarm module 178 may be connected with the keyboard 138.

In an alternate embodiment, the digital observation system 10 comprises a digital camera and a base unit. The digital camera includes a CCD image sensor memory adapted to store video data, a CCD image sensor adapted to transmit the stored video data in analog RGB color space format native to the CCD image sensor (analog RGB data), wherein the CCD image sensor comprises the CCD image sensor memory, a CDS circuit adapted to receive the analog RGB data from the CCD image sensor and convert the analog RGB data into digital RGB data, wherein the CDS circuit is operably coupled to the CCD image sensor, a PLD adapted to: receive the transmitted digital RGB data from the CDS circuit, convert the received digital RGB data into YUV color space format (digital YUV data), and transmit the digital YUV data to the CDS circuit, wherein the digital camera PLD interfaces to the CDS circuit, and a physical interface adapted to receive the digital YUV data and transmit the digital YUV data with reduced operational overhead and increased operational functionality, wherein the physical interface is operably coupled to the CDS circuit and wherein the digital camera PLD interfaces to the physical interface. The base unit includes a base unit physical interface adapted to receive the digital YUV data with the reduced operational overhead and the increased operational functionality from the digital camera physical interface, a base unit PLD operably coupled to the base unit physical interface, and a display adapted to display the digital YUV data with reduced operational overhead and increased operational functionality, wherein the display is operably coupled to the PLD.

The digital camera PLD is further adapted to control timing signals to the CCD image sensor to transmit the digital YUV data to the CDS circuit, and to delay one line of the digital YUV data with the reduced operational overhead and the increased operational functionality transmission when a transmission error correction occurs. The digital YUV data with the reduced operational overhead and the increased operational functionality is further transmitted from the digital camera physical interface and received by the base unit physical interface via a physical layer device.

In a further alternate embodiment, a digital observation system comprises a first module (for example, a digital camera) and a second module (for example, a base unit). The first module includes a memory adapted to store video data, a first circuit (for example, a CCD image sensor) adapted to transmit the stored video data in a first representation of a first format (for example, analog RGB data), wherein the first circuit comprises the memory, a second circuit (for example, a CDS) adapted to receive the data in the first representation of the first format from the first circuit and convert the data in the first representation of the first format into a second representation of the first format (for example, digital RGB data), wherein the first circuit is operably coupled to the second circuit, a third circuit (for example, a PLD) adapted to control timing signals to the first circuit to transmit the data in the first representation of the first format to the second circuit, wherein the third circuit interfaces to the first circuit and to the second circuit, and a fourth circuit (for example, an interface) adapted to receive the data in the second representation of the first format from the second circuit and transmit the data in the second representation of the first format, wherein the fourth circuit is operably coupled to the second circuit.

The second module includes a first circuit (for example, a base unit interface) adapted to receive the transmitted data in the second representation of the first format, a second circuit (for example, a display), and a third circuit (for example, a base unit PLD) adapted to control timing signals to the first circuit of the second module to transmit the data in the second representation of the first format for display via the second circuit, wherein the third circuit interfaces to the first circuit of the second module and interfaces to the second circuit of the second module.

Figure 6:
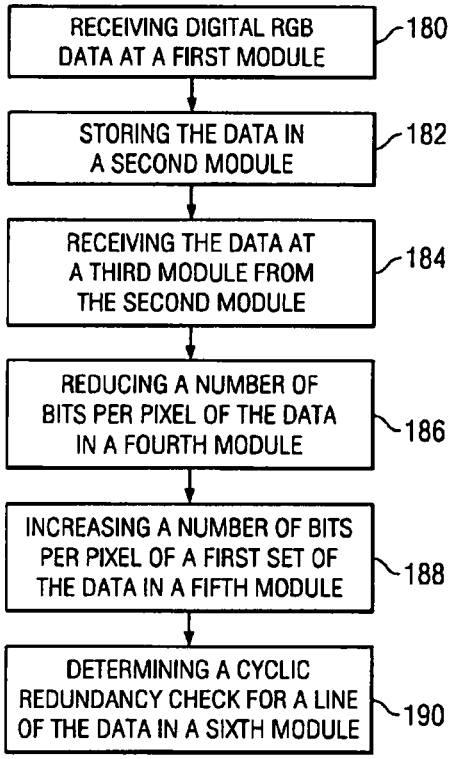
FIG. 6 illustrates a flow chart for data processing in accordance with an exemplary embodiment of the present invention.

Referring now to FIG. 6, a method for data processing is presented. The method begins at steps 180 and 182, respectively, with receiving digital RGB data at a first module (for example, a first multiplexer of a two video line delay memory), and storing the data in a second module (for example, a first line delay). At step 184, receiving the data at a third module (for example, a second multiplexer) from the second module occurs (the second module is operably coupled to the first module and the third module). The method proceeds to steps 186 and 188, respectively, where reducing a number of bits per pixel of the data in a fourth module (for example, a data reduction module), and increasing a number of bits per pixel of a first set of the data in a fifth module (for example, a gamma correct module) occur. Determining a cyclic redundancy check (CRC) for a line of the data in a sixth module (for example, a CRC generator) occurs in step 190. The method may further comprise adding the CRC, by the sixth module, to the end of the data line, and transmitting, by a seventh module (for example, a physical interface) to a destination (for example, a base unit): header data and the data line comprising the CRC.

Figure 7:
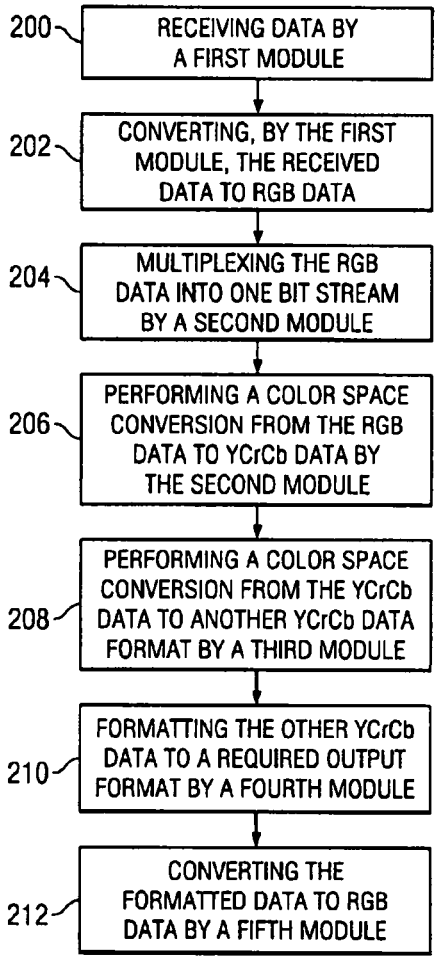
FIG. 7 illustrates an alternate flow chart for data processing in accordance with an exemplary embodiment of the present invention.

Referring now to FIG. 7, another method for data processing is presented. The method begins at steps 200 and 202, respectively, with a receiving of data (such as image sensor data) by a first module (such as one or more of the FIFO modules 150) from an origination (such as the digital camera 12), and converting, by the first module, the received data to RGB data (such as 24-bit RGB output data). At step 204, multiplexing the RGB data into one bit stream (such as a 24-bit stream) by a second module (such as the pre-video processor multiplexer 152) occurs, and, at step 206, performing a color space conversion from the RGB data to YCrCb data (such as YCrCb 4:4:4 data) by the second module occurs. At step 208 performing a color space conversion from the YCrCb data to another YCrCb data format (such as a conversion from YCrCb 4:4:4 to YCrCb 4:2:2) by a third module (such as the video processing module 156) occurs. Such a conversion reduces the amount of data to be transmitted with insignificant image degradation.

The method proceeds with formatting the other YCrCb data to a required output format by a fourth module (such as the LCD top 158) at step 210, and converting the formatted data to RGB data (such as RGB 4:4:4 data) by a fifth module (such as the LCD processing module 162) at step 212. The fifth module may additionally perform color, sharpness, contrast, and brightness alterations.

The method may further include steps for multiplexing locally received data (such as data received from the decoder 154) and remotely received data (such as the YCrCb 4:4:4 data) into a high speed digital stream by the third module, and formatting the output data to various memory locations (such as memories 134).

Although an exemplary embodiment of the system and method of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, a plurality of cameras 12 and base units 14 may be utilized with the present invention. Further, the camera physical transceiver 24 and the base unit physical transceiver 26 may be operably coupled to each other via other connections, including copper, fiber and wireless, if the transceivers were modified to accommodate such other connections. Additionally, the connection 25 may comprise an entity with dynamic characteristics thus altering maximum travel time, data transmission travel time, acknowledgement time, line time, and processing time. Also, the system 10 may operate at a varying distance which will alter the travel time and time for the system to start and process any transmissions. Further, various data transmission protocols comprising different information and/or sizes of information may be used with the system 10. Additionally, a lesser or greater number of modules may comprise the system 10, the digital camera 12, and/or the base unit 14.

What we claim is:

[1. A digital observation system comprising:

a digital camera including:

a charge coupled device (CCD) image sensor memory adapted to store video data;

a CCD image sensor adapted to transmit the stored video data in analog RGB color space format native to the CCD image sensor (analog RGB data), wherein the CCD image sensor comprises the CCD image sensor memory;

a correlated double sampling (CDS) circuit adapted to receive the analog RGB data from the CCD image sensor and convert the analog RGB data into digital RGB data, wherein the CDS circuit is operably coupled to the CCD image sensor; and a physical interface adapted to receive the digital RGB data and transmit the digital RGB data with reduced operational overhead and increased operational functionality, wherein the physical interface is operably coupled to the CDS circuit;

a programmable logic device (PLD) adapted to delay one line of the digital RGB data when a transmission error correction occurs; and a base unit including:

a base unit physical interface adapted to receive the digital RGB data with the reduced operational overhead and the increased operational functionality from the digital camera physical interface;

a base unit programmable logic device (PLD) operably coupled to the base unit physical interface; and a display adapted to display the digital RGB data with reduced operational overhead and increased operational functionality, wherein the display is operably coupled to the PLD.]

[2. The digital observation system of claim 1, wherein the base unit PLD is adapted to control timing signals to display the digital RGB data with the reduced operational overhead and the increased operational functionality.]

[3. The digital observation system of claim 1, wherein the digital camera PLD is adapted to control timing signals to the CCD image sensor to transmit the analog RGB data to the CDS circuit, wherein the digital camera PLD interfaces to the CDS circuit.]

[4. The digital observation system of claim 1, wherein the digital RGB data with the reduced operational overhead and the increased operational functionality is transmitted from the digital camera physical interface and received by the base unit physical interface via a physical layer device.]

[5. A digital observation system comprising:

a digital camera including:

a charge coupled device (CCD) image sensor memory adapted to store video data;

a CCD image sensor adapted to transmit the stored video data in analog RGB color space format native to the CCD image sensor (analog RGB data), wherein the CCD image sensor comprises the CCD image sensor memory;

a correlated double sampling (CDS) circuit adapted to receive the analog RGB data from the CCD image sensor and convert the analog RGB data into digital RGB data, wherein the CDS circuit is operably coupled to the CCD image sensor; and a physical interface adapted to receive the digital RGB data and transmit the digital RGB data with reduced operational overhead and increased operational functionality, wherein the physical interface is operably coupled to the CDS circuit; and a base unit including:

a base unit physical interface adapted to receive the digital RGB data with the reduced operational overhead and the increased operational functionality from the digital camera physical interface;

a base unit programmable logic device (PLD) operably coupled to the base unit physical interface; and a display adapted to display the digital RGB data with reduced operational overhead and increased operational functionality, wherein the display is operably coupled to the PLD; and operational overhead reduction by elimination of at least one of:

error detection;

source addressing; and destination addressing.]

[6. A digital observation system comprising:

a digital camera including:

a charge coupled device (CCD) image sensor memory adapted to store video data;

a CCD image sensor adapted to transmit the stored video data in analog RGB color space format native to the CCD image sensor (analog RGB data), wherein the CCD image sensor comprises the CCD image sensor memory;

a correlated double sampling (CDS) circuit adapted to receive the analog RGB data from the CCD image sensor and convert the analog RGB data into digital RGB data, wherein the CDS circuit is operably coupled to the CCD image sensor;

a programmable logic device (PLD) adapted to:

receive the transmitted digital RGB data from the CDS circuit;

convert the received digital RGB data into YUV color space format (digital YUV data);

transmit the digital YUV data to a Y average circuit which determines an average brightness;

transmit the average brightness to an exposure control circuit, which generates an automatic gain control signal; and transmit the automatic gain control signal back to the CDS circuit; and a physical interface adapted to receive the digital YUV data and transmit the digital YUV data with reduced operational overhead and increased operational functionality, wherein the physical interface is operably coupled to the CDS circuit and wherein the digital camera PLD interfaces to the physical interface; and a base unit including:

a base unit physical interface adapted to receive the digital YUV data with the reduced operational overhead and the increased operational functionality from the digital camera physical interface;

a base unit PLD operably coupled to the base unit physical interface; and a display adapted to display the digital YUV data with reduced operational overhead and increased operational functionality, wherein the display is operably coupled to the base unit PLD.]

[7. The digital observation system of claim 6, wherein the digital camera PLD is further adapted to control timing signals to the CCD image sensor to transmit the digital YUV data to the CDS circuit.]

[8. The digital observation system of claim 6, wherein the digital camera PLD is further adapted to delay one line of the digital YUV data with the reduced operational overhead and the increased operational functionality transmission when a transmission error correction occurs.]

[9. The digital observation system of claim 6, wherein the digital YUV data with reduced operational overhead and increased operational functionality is transmitted from the digital camera physical interface and received by the base unit physical interface via a physical layer device.]

[10. A digital camera programmable logic device (PLD) configured to:

control timing signals to a CCD image sensor to transmit analog RGB data to a CDS circuit where the analog RGB data is converted to digital RGB data; and delay one line of the digital RGB data transmission when a transmission error correction occurs;

wherein the digital RGB data transmission comprises reduced operational overhead, with respect to a protocol standard;

wherein the operational overhead includes at least one of:

error detection;

source addressing;

destination addressing; and multi-speed operation.]

[11. The digital camera PLD of claim 10 further comprising a two video line delay memory configured to delay the one line of the digital RGB data transmission when the transmission error correction occurs.]

[12. A digital camera programmable logic device (PLD) configured to:

receive digital RGB data from a correlated double sampling (CDS) circuit;

convert the received digital RGB data into digital YUV data;

transmit the digital YUV data to a Y average circuit which determines the average brightness;

transmit the average brightness to an exposure control circuit, which generates an automatic gain control (AGC) signal; and transmit the AGC signal to the CDS circuit, wherein the digital camera PLD interfaces to the CDS circuit.]

*13. A digital observation system comprising:*

*a digital camera including:*

*an image sensor memory adapted to store video data;*

*an image sensor adapted to transmit the stored video data in an analog RGB color space format, wherein the image sensor comprises the image sensor memory;*

*a circuit adapted to receive the transmitted video data from the image sensor and convert the transmitted video data into digital RGB data, wherein the circuit is operably coupled to the image sensor; and*

*a physical interface adapted to receive the digital RGB data and transmit the digital RGB data with reduced operational overhead and increased operational functionality, wherein the physical interface is operably coupled to the circuit;*

*a programmable logic device (PLD) adapted to delay one line of the digital RGB data when a transmission error occurs; and*

*a base including:*

*a base physical interface adapted to receive the digital RGB data with the reduced operational overhead and the increased operational functionality from the digital camera physical interface;*

*a base programmable device operably coupled to the base physical interface; and*

*a display adapted to display the digital RGB data with reduced operational overhead and increased operational functionality, wherein the display is operably coupled to the base programmable device.*

*14. The digital observation system of claim 13, wherein the base programmable device is adapted to control timing signals to display the digital RGB data with the reduced operational overhead and the increased operational functionality.*

*15. The digital observation system of claim 13, wherein the digital camera PLD is adapted to control timing signals to the image sensor to transmit the analog RGB data to the circuit, wherein the digital camera PLD interfaces to the circuit.*

*16. The digital observation system of claim 13, wherein the digital RGB data with the reduced operational overhead and the increased operational functionality is transmitted from the digital camera physical interface and received by the base physical interface via a physical layer device.*

*17. The digital observation system of claim 13, wherein the transmitted video data comprises analog RGB data.*

*18. The digital observation system of claim 13, wherein the image sensor transforms the stored video data into the analog RGB color space format.*

*19. The digital observation system of claim 13, wherein the image sensor transforms the stored video data into the analog RGB color space format native to the image sensor.*

*20. The digital observation system of claim 13, wherein the circuit comprises a correlated double sampling circuit.*

*21. The digital observation system of claim 13, wherein the base includes a processor that is configured to process color filter array data from the digital camera, wherein the processed color filter array data corresponds to a color image.*

*22. The digital observation system of claim 13, wherein the image sensor is adapted to collect analog color filter array data including values for light intensity of a plurality of different colors.*

*23. A digital observation system comprising:*

*a digital camera including:*

*an image sensor memory adapted to store video data;*

*an image sensor adapted to transmit the stored video data in analog RGB color space format native to the image sensor, wherein the image sensor comprises the image sensor memory;*

*a first circuit adapted to receive the transmitted video data from the image sensor and convert the transmitted video data into digital RGB data, wherein the first circuit is operably coupled to the image sensor;*

*a programmable logic device (PLD) adapted to:*

*receive the transmitted digital RGB data from the first circuit;*

*convert the received digital RGB data into digital YUV data;*

*transmit the digital YUV data to a second circuit which determines an average brightness;*

*transmit the average brightness to an exposure control circuit, which generates an automatic gain control signal; and*

*transmit the automatic gain control signal back to the first circuit; and*

*a physical interface adapted to receive the digital YUV data and transmit the digital YUV data with reduced operational overhead and increased operational functionality, wherein the physical interface is operably coupled to the first circuit and wherein the digital camera PLD interfaces to the physical interface; and*

*a base including:*

*a base physical interface adapted to receive the digital YUV data with the reduced operational overhead and the increased operational functionality from the digital camera physical interface;*

*a base programmable device operably coupled to the base physical interface; and*

*a display adapted to display the digital YUV data with reduced operational overhead and increased operational functionality, wherein the display is operably coupled to the base programmable device.*

*24. The digital observation system of claim 23, wherein the digital camera PLD is further adapted to control timing signals to the image sensor to transmit the digital YUV data to the first circuit.*

*25. The digital observation system of claim 23, wherein the digital camera PLD is further adapted to delay one line of the digital YUV data with the reduced operational overhead and the increased operational functionality transmission when a transmission error correction occurs.*

*26. The digital observation system of claim 23, wherein the digital YUV data with reduced operational overhead and increased operational functionality is transmitted from the digital camera physical interface and received by the base physical interface via a physical layer device.*

*27. The digital observation system of claim 23, wherein the first circuit comprises a correlated double sampling circuit.*

*28. The digital observation system of claim 23, wherein the transmitted video data comprises analog RGB data.*

*29. The digital observation system of claim 23, wherein the image sensor transforms the stored video data into the analog RGB color space format.*

*30. The digital observation system of claim 23, wherein the image sensor transforms the stored video data into the analog RGB color space format native to the image sensor.*

*31. A digital camera programmable logic device (PLD) configured to:*

*control timing signals to an image sensor to transmit analog RGB data to a circuit, wherein the circuit converts the analog RGB data to digital RGB data; and*

*delay one line of the digital RGB data transmission when a transmission error correction occurs;*

*wherein the digital RGB data transmission comprises reduced operational overhead, with respect to a protocol standard;*

*wherein the operational overhead includes at least one of:*

*error detection;*

*source addressing;*

*destination addressing; and*

*multi-speed operation.*

*32. The digital camera PLD of claim 31, wherein the circuit comprises a correlated double sampling circuit.*

*33. The digital camera PLD of claim 31 comprising a two video line delay memory configured to delay the one line of the digital RGB data transmission when the transmission error correction occurs.*

*34. A digital camera programmable logic device (PLD) configured to:*

*receive digital RGB data;*

*convert the received digital RGB data into digital YUV data;*

*transmit the digital YUV data to a first circuit which determines the average brightness;*

*transmit the average brightness to an exposure control circuit, which generates an automatic gain control (AGC) signal; and*

*transmit the AGC signal to a second circuit that provided the digital RGB data, wherein the digital camera PLD interfaces to the second circuit.*

*35. The digital camera PLD of claim 34, wherein the second circuit comprises a correlated double sampling circuit.*

* * * * *